United States Patent
Lindsey et al.

(10) Patent No.: US 6,671,875 B1
(45) Date of Patent: Dec. 30, 2003

(54) MANIPULATION OF AN OBJECT-ORIENTED USER INTERFACE PROCESS TO PROVIDE ROLLBACK OF OBJECT-ORIENTED SCRIPTS FROM A PROCEDURAL BUSINESS LOGIC DEBUGGER

(75) Inventors: Beth Bridgers Lindsey, Fuquay Varina, NC (US); Anthony Hayden Lindsey, Fuquay Varina, NC (US); Timothy Wilson, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 09/667,153

(22) Filed: Sep. 21, 2000

(51) Int. Cl.[7] ................................................. G06F 9/44
(52) U.S. Cl. ...................................................... 717/129
(58) Field of Search ............................... 717/106–108, 717/124–129; 712/202

(56) References Cited

U.S. PATENT DOCUMENTS

| | | | | |
|---|---|---|---|---|
| 5,590,330 A | | 12/1996 | Coskun et al. ............... | 717/126 |
| 5,615,371 A | * | 3/1997 | Iuchi ........................... | 717/129 |
| 5,812,850 A | | 9/1998 | Wimble ....................... | 717/131 |
| 5,819,093 A | | 10/1998 | Davidson et al. ........... | 717/126 |
| 5,889,991 A | | 3/1999 | Consolatti et al. .......... | 717/109 |
| 5,901,315 A | | 5/1999 | Edwards et al. ............ | 717/124 |
| 6,035,419 A | * | 3/2000 | Breslau et al. .............. | 714/20 |
| 6,205,465 B1 | * | 3/2001 | Schoening et al. ......... | 709/102 |
| 6,308,315 B1 | * | 10/2001 | Dice et al. ................... | 717/106 |
| 6,385,764 B1 | * | 5/2002 | Blandy et al. ............... | 717/127 |

OTHER PUBLICATIONS

"Mixed Mode State Saving for Object Oriented/Procedural Debugger," IBM Technical Disclosure Bulletin, Apr. 1, 1994, IBM, NB9404587, pp. 587–588.*

IBM Technical Disclosure Bulletin, Vol 37, No. 3 Mar. 1994, T. W. Medlin, G. Miller and M. P. Nally, "Interfacing Between Structured and Object–Oriented Languages" pp. 661–663.

IBM Technical Disclosure Bulletin, Vol 34, No. 6, Nov. 1991, P. R. Chandler, W. A. Miller and J. K. Rayborn, "Smalltalk/V PM Officevision/2 Release 2 Mail Service" pp. 428–430.

* cited by examiner

Primary Examiner—John Chavis
Assistant Examiner—L J Shrader
(74) Attorney, Agent, or Firm—Gregory M. Doudnikoff; Marcia L. Doubet

(57) ABSTRACT

The present invention provides a method, system, and computer program product for programmatically manipulating a user interface process to maintain synchronization of object-oriented programming language methods during a rollback operation in a procedural logic debugger. This technique is designed for use in integrated execution environments that provide seamless execution of, and transfer of control between, objects written in an object-oriented programming language and business logic written in a procedural programming language, and which span multiple programming models based on different technologies. The disclosed technique enables developers to have greater control over the debugging process by manipulating the next statement to be executed. The procedural debugger automatically positions to the selected statement, and a corresponding user interface process is then programmatically adjusted to bring the user interface into synchronization with the selected statement. (Or, the debugger itself may initiate the repositioning operation, in which case the technique operates in the same manner to provide a synchronized result.)

24 Claims, 12 Drawing Sheets

VG_FUNCTION1 - Function Editor
File  Edit  View  Define  Tools  Help

EXECUTE ▼                                    001:001

;Do some VG code, then invoke a script, then do some more VG code

IF VG_CUSTOMER_RECORD.AGE < 0
OR VG_CUSTOMER_RECORD.AGE > 130;   *1010*
    EZESCRPT("scriptWhichInvokesFunction2");
END;

IF VG_CUSTOMER_RECORD.NAME IS BLANK;
    ..........
END;

VG_FUNCTION2 - Function Editor
File  Edit  View  Define  Tools  Help

EXECUTE ▼                                    001:001

;Do some more VG code, maybe invokes another script or the same script, etc

IF VG_CUSTOMER_RECORD.AGE < 0
OR VG_CUSTOMER_RECORD.AGE > 130;
    ..........
END;

IF VG_CUSTOMER_RECORD.NAME IS BLANK;
    ..........
END;

MANIPULATION OF AN OBJECT-ORIENTED USER INTERFACE PROCESS TO PROVIDE ROLLBACK OF OBJECT-ORIENTED SCRIPTS FROM A PROCEDURAL BUSINESS LOGIC DEBUGGER

RELATED INVENTIONS

The present invention is related to U.S. patent Ser. No. 09/666,849, which is entitled "Blending Object-Oriented Objects with Traditional Programming Languages" (hereinafter referred to as the "first related invention"), and U.S. patent Ser. No. 09/666,442, which is entitled "Synchronous Execution of Object-Oriented Scripts and Procedural Code from within an Interactive Test Facility" (hereinafter referred to as the "second related invention"), both of which are commonly assigned to the International Business Machines Corporation ("IBM") and were filed concurrently herewith, and which are hereby incorporated herein by reference.

BACKGROUND OF THE INVENTION

1. Field of the Invention

The present invention relates to computer software, and deals more particularly with a method, system, and computer program product for programmatically manipulating a user interface process to maintain synchronization of object-oriented programming language methods (or "scripts") during a rollback operation in a procedural logic debugger.

2. Description of the Related Art

Many modern program development environments include both object-oriented (OO) components and traditional non-object-oriented (non-OO) or procedural programming language constructs. The OO components are often used in the user interface. They may also be the main data objects that describe the business system (e.g. Customer objects, Order objects, and so forth in a customer ordering application). The business logic of the application, however, might not be written using an OO language, but might be written instead in a more traditional procedural programming language. It might even be legacy code that only uses OO objects by introduction of a new graphical user interface (GUI). The OO and procedural constructs might even execute in two completely different processes and namespaces.

A problem arises when developers need to merge the OO and non-OO technologies in a productive way. In addition to development concerns (which are addressed in the first related application) when application environments include a mix of OO objects and non-OO programming language constructs, a number of challenges are also introduced for the testing of these mixed application environments. Many interactive test facilities, or "test debuggers", provide features that allow users to animate (i.e. display, and step through the logic of) the business logic which is invoked by GUI applications, where that business logic is often written in a procedural programming language. This is typically done using an event-driven facility which knows how to become active when a specific event from the graphical user interface causes invocation of a business logic code component. When the GUI event is triggered, a debugger for the procedural code is invoked. A window (referred to herein as a "test monitor window") is then displayed to enable the developer to interact with and control the business logic debugging.

Developers are accustomed to being able to explicitly reposition a debugger, to cause execution of a code statement other than the one that would be executed next according to the logic flow of the underlying code. Existing non-integrated debuggers (OO code debuggers as well as non-OO code debuggers) typically provide the developer with a mechanism for backing up in the execution flow from one statement to a different statement in the subroutine or code component which is currently executing, or for positioning to a statement in a subroutine or code component other than the one currently executing. As an example of this type of mechanism, a graphical display of the debugger's execution history may be provided, from which the developer can select to reposition execution to an earlier-executed component. Or, the code of a currently-executing function may be displayed in a graphical window, and the developer may be allowed to reposition to a previously executed code statement in that window. Explicitly repositioning the code statement that will execute next in this manner provides the developer with more control over the debugging process.

There may also be situations in which the developer dynamically makes code changes to the executing logic during the debugging process, where these code changes then cause the execution path to be automatically repositioned under control of the corresponding (i.e. OO or non-OO) debugging tool.

As the repositioning process (referred to equivalently herein as a rollback process) moves a current statement pointer for the non-OO code, it is desirable for the OO code to be simultaneously adjusted to remain synchronized with the non-OO code. In a mixed OO and non-OO environment, there are inter-relationships between the OO code being executed in a user interface (UI) process and the non-OO code executing in a non-OO process. For example, the non-OO code may have been invoked from an OO method, and the OO method may contain additional statements that are not to be executed until the invoked non-OO code completes. The OO code may also invoke other non-OO code components, and conversely the non-OO code may invoke other OO methods. There may even be recursive invocations between the OO and non-OO code. If the inter-relationships are not maintained during a repositioning operation, the debugging process becomes much more difficult as the developer will be presented with an execution scenario that is confusing and which does not accurately reflect the underlying code.

There are no prior art techniques known to the inventors that provide for programmatically repositioning the OO code while debugging in this type of mixed execution environment so that the OO code remains synchronized during a repositioning operation in the non-OO debugger.

The problem of integrating OO and non-OO languages was discussed in "Bridging traditional and object technologies: Creating transitional applications", A. H. Lindsey and P. R. Hoffnan, IBM Systems Journal, Vol. 36, No. 1, (1997), which focuses on rapid application development using visual programming and object-oriented techniques. With regard to the debugging task in an integrated environment, this paper states that it is "particularly unpleasant" when developers are required to perform debugging across language (i.e. OO and non-OO) boundaries. Id., fn 17. However, no techniques were proposed for dealing with the debugging issues.

U.S. Pat. No. 5,901,315, which is titled "Method for Debugging a Java Application Having Native Method Dynamic Load Libraries", discloses a technique for allowing simultaneous debugging of Java code and native (e.g. C or C++) dynamic load library (DLL) functions, wherein a single debugger interface is provided for both. However, there is no discussion of maintaining synchronization between OO and non-OO code in this patent.

Accordingly, what is needed is a technique for programmatically manipulating code of an OO user interface that executes in an integrated, seamless manner with procedural language code components such that the OO code remains properly synchronized with the procedural language code when a repositioning operation occurs during operation of a procedural code debugger.

This programmatic synchronization should be provided even though the OO code and procedural components may be executing in different processes, different namespaces, and/or different software products.

SUMMARY OF THE INVENTION

An object of the present invention is to provide a technique for programmatically manipulating code of an OO user interface that executes in an integrated, seamless manner with procedural language code components such that the OO code remains properly synchronized with the procedural language code when a repositioning operation occurs during operation of a code debugger.

A further object of the present invention is to provide a technique for programmatic synchronization of object-oriented code and procedural language code components even though the methods and procedural components may be executing in different processes, different namespaces, and/or different software products.

Still another object of the present invention is to provide this technique for programmatic synchronization in response to an explicit developer-initiated repositioning action during debugging.

Another object of the present invention is to provide this technique for programmatic synchronization in response to a repositioning action initiated by a test debugger tool.

Yet another object of the present invention is to provide this technique for programmatic synchronization in an integrated debugging environment where control efficiently passes back and forth between object-oriented code execution and procedural language code execution.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for programmatically maintaining synchronization of object-oriented code during a repositioning operation occurring in a procedural language code debugger. This technique comprises: executing one or more object-oriented methods written in an object-oriented programming language; executing, under control of the procedural language code debugger, one or more procedural components written in a procedural programming language, wherein at least one of the procedural components contains one or more references to selected ones of the object-oriented methods; detecting a rollback of execution, in the procedural language code debugger, to a particular procedural component; determining whether any currently executing object-oriented methods should be rolled back, based upon the particular procedural component; and rolling back one or more of the currently executing object-oriented methods accordingly.

The determination may further comprise interrogating a stack which comprises an element for each currently executing object-oriented method invoked by one or more currently executing procedural components, and determining (during the interrogation) whether an element corresponding to the particular procedural component is present on the stack. The rolling back may further comprise: popping all stack elements up to the corresponding element, if the corresponding element is present, or up through an element next preceding where the corresponding element would have been on the stack, otherwise; finding a set of frames on a user interface process stack where the set comprises those referencing a name of an object-oriented method that was invoked by the particular procedural component; positioning to a selected one of the set of frames, wherein the selected one is that which precedes an invocation of the object-oriented method having the name; and removing all frames from the user interface process stack up to the selected one.

The procedural language code, debugger and the object-oriented method may operate in different processes, different software products, and/or in different namespaces.

The detecting may further comprise detecting a user-initiated rollback, or detecting a rollback initiated by the procedural language code debugger.

The present invention will now be described with reference to the following drawings, in which like reference numbers denote the same element throughout.

BRIEF DESCRIPTION OF THE DRAWINGS.

FIGS. 7–10 illustrate sample code fragments and sample windows that will be used to describe operation of a preferred embodiment of the present invention.

DESCRIPTION OF THE PREFERRED EMBODIMENT

Figure 1:
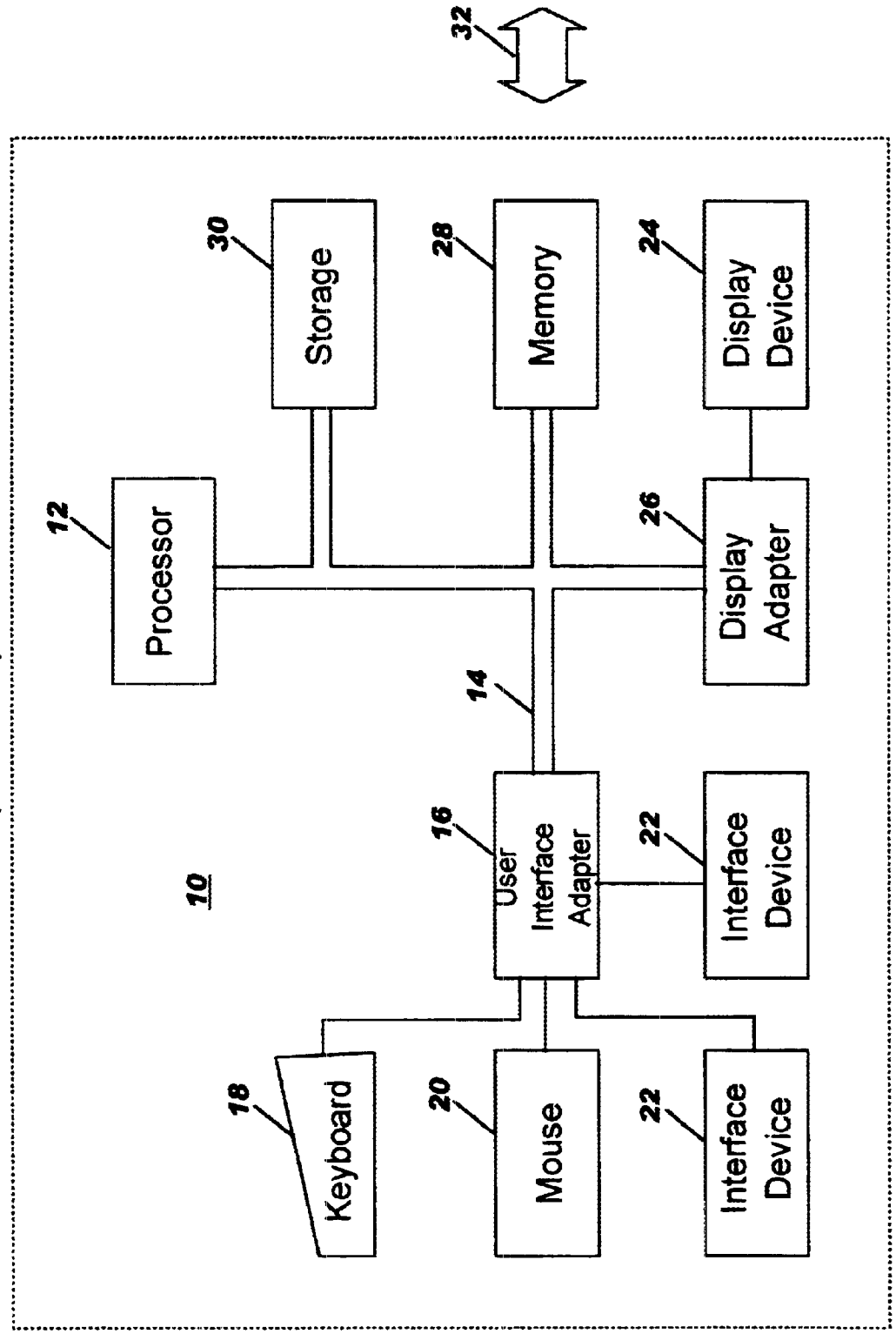
FIG. 1 is a block diagram of a computer workstation environment in which the present invention may be practiced.

FIG. 1 illustrates a representative workstation hardware environment in which the present invention may be practiced. The environment of FIG. 1 comprises a representative computer or intelligent workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

Software programming code which embodies the present invention is typically accessed by the microprocessor 12 of the workstation 10 from long-term storage media 30 of some type, such as a CD-ROM drive or hard drive. In a client-server networking environment (not shown), such software programming code may be stored with storage associated with a server. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

In the preferred embodiment, the present invention is implemented as objects (classes and methods) in an object-oriented programming language such as Smalltalk or Java™. ("Java" is a trademark of Sun Microsystems, Inc.) The description herein of the preferred embodiment is primarily in terms of a Smalltalk implementation, although it will be obvious to one of skill in the art how an analogous Java implementation can be created using the teachings herein. The present invention has been implemented in the Interactive Test Facility (ITF) component of the IBM VisualAge® Generator Developer for OS/2® and Windows NT® 4.0, which are available from the International Business Machines Corporation ("IBM"). (VisualAge and OS/2 are registered trademarks of IBM, and Windows NT is a registered trademark of Microsoft Corporation.) However, the inventive concepts disclosed herein may be used advantageously in other interactive test environments which need to handle debugging across multiple technologies and which need to provide properly synchronized rollback or repositioning operations. References herein to using the present invention in an "ITF" or "interactive test facility" are for purposes of illustration, and are not meant to limit the present invention to use with the ITF component of IBM's VisualAge Generator (VG) products.

The present invention provides a technique for manipulating a user interface process to provide rollback of OO scripts when a rollback operation occurs in a procedural logic debugger of an interactive debugging environment, where that debugging environment supports integrated execution of OO and non-OO components and presents a single, logical interface while actually spanning multiple separate programming models which are based on different technologies. (Further, these OO and non-OO programming models may operate in different execution contexts and different namespaces, and may be provided by distinct software products.)

Using the techniques described in the first and second related inventions, the VisualAge Generator Interactive Test Facility allows a developer to mix debugging of OO or GUI scripts (referred to hereinafter as "GUI" scripts for ease of reference) and non-OO business logic. Synchronous execution of GUI scripts from within the VG business logic is provided by the special function keyword EZESCRPT, as described in those related inventions. When a GUI script is invoked from within procedural code executing in the interactive test facility, multiple OO processes (Smalltalk or Java processes, in the preferred embodiment) must be manipulated to transfer control seamlessly between the non-OO and OO code. In addition, the GUI script that is invoked might actually call back into the procedural code (into the same or a different code component), so it is possible for numerous layers of OO code and non-OO code to be currently processing. The techniques with which this processing occurs are described in the related inventions.

The test monitor of the interactive test facility has previously allowed developers to reposition the next statement pointer, to alter the execution path during debugging. The capability to programmatically synchronize the GUI process in response to a repositioning operation has not been available therein until implementation of the present invention. Similarly, existing prior art debuggers do not provide this type of synchronization during a repositioning operation in an integrated execution environment.

The problem with supporting the repositioning operation in integrated execution environments occurs because the GUI scripts, which are executing in a Smalltalk or Java UI process, need to be synchronized with the repositioned procedural language code which is executing in a non-OO process. The code that supports the integrated dual debugging of the OO and non-OO code, using a technique such as that described in the second related invention, needs to roll back not only the procedural language process but also the original UI process, which invoked the procedural language process originally, in which the GUI script is running. The present invention provides for synchronizing the rollback of both the UI process and the non-OO process.

If a repositioning operation is initiated when no GUI scripts are currently executing in a UI process, then the repositioning operation occurs according to prior art techniques. That is, procedural test debuggers know how to manipulate their own execution stacks to pop off currently executing statements or currently executing code components (also referred to as functions, subroutines, or programs).

If, however, a GUI script is executing, the situation is much more complicated. As described in the first related invention, a GUI script may be synchronously invoked during the execution of a procedural code component. Using the techniques disclosed therein, a special keyword (which will be referred to hereinafter as "EZESCRPT" for ease of reference) is used to trigger the invocation. The executing GUI script may contain numerous code statements that invoke additional procedural code components and/or manipulate different OO objects. To perform a rollback operation, since the user has requested to reposition the next statement pointer of the procedural code debugger to a statement prior to the invocation of this currently-executing GUI script, the entire GUI script must be popped off the UI process stack so that no further Smalltalk or Java statements (as appropriate) in that GUI script are run. In this situation, in addition to handling its own execution stacks, the interactive test facility must manipulate the UI process to roll back to a state before the particular GUI script that needs to be popped off. Note that it is not adequate to simply pop all GUI scripts off the UI process stack: instead, contextual information must be used to determine which GUI scripts should be popped off and which should stay on the stack to finish execution when testing resumes. The process frames on the UI process stack will be manipulated, according to the present invention, such that the correct GUI scripts remain on the stack. (This type of manipulation of the process frames is available in the prior art, and is performed by prior art OO debuggers during OO code debugging. However, manipulating the process frames from an outside process, such as from an interactive test facility in which procedural code is being debugged and rolled back, is not known in the art.)

The preferred embodiment of the present invention will now be described with reference to FIGS. 2 through 10.

Figure 2:
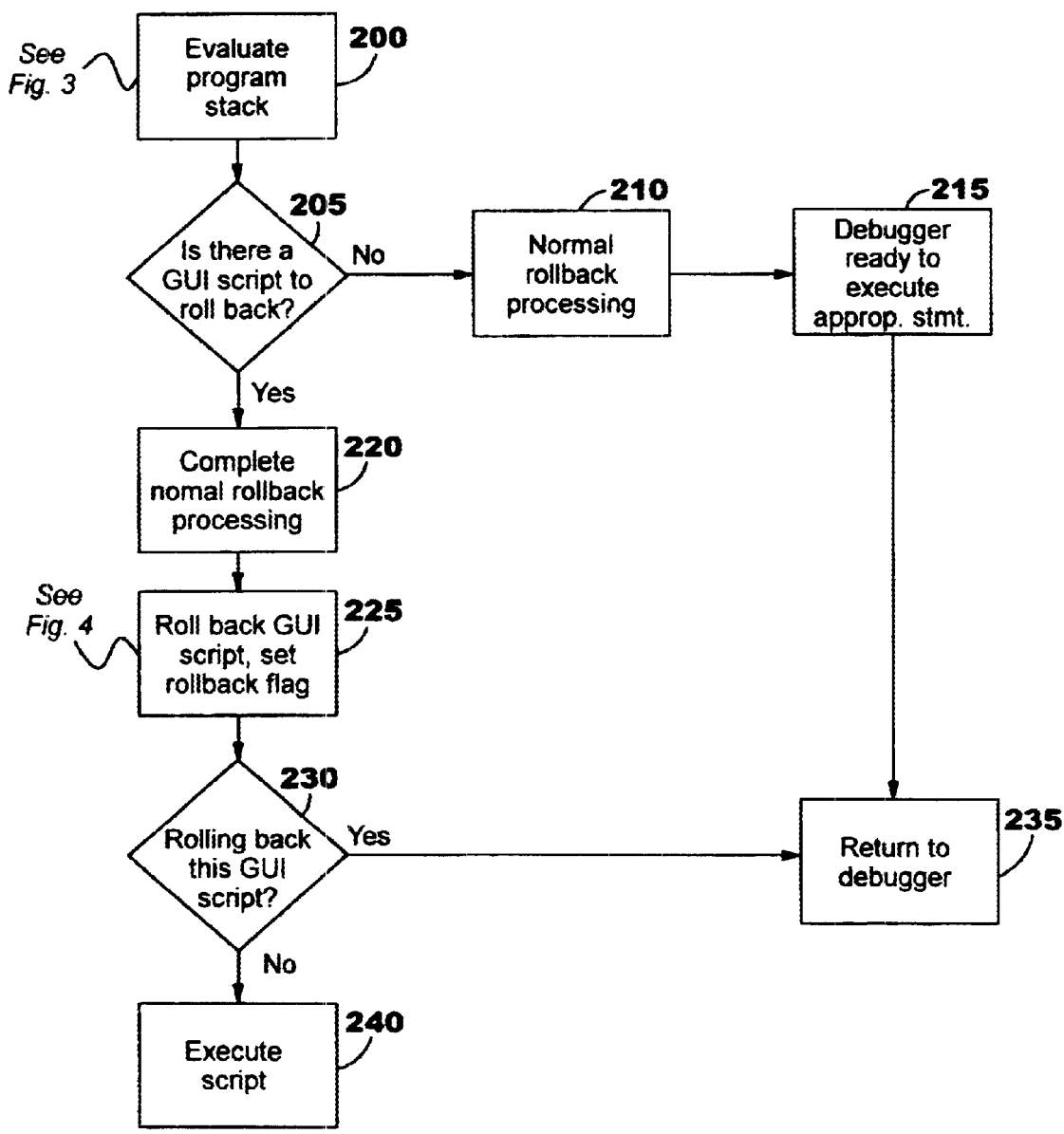
FIGS. 2–4 illustrate flowcharts depicting logic that may be used to implement a preferred embodiment of the present invention.

FIG. 2 depicts an overview of the logic that may be used to implement the preferred embodiment of the present invention. This logic is invoked when a repositioning operation has been detected. (As stated earlier, a repositioning operation may be explicitly initiated by a developer, or it may be initiated by the interactive test facility based upon changes that are made while debugging. For ease of reference, the repositioning operation will be discussed hereinafter as if it is invoked explicitly by the developer.)

When a rollback occurs, the interactive test facility must set up its own execution stack so that it knows what procedural logic component and statement should execute next. The UI process must also be synchronized to reflect this rollback operation. Any GUI scripts that may be executing, and which were invoked from procedural components that will be skipped over during the rollback, become irrelevant. These GUI scripts must therefore be removed so that they will not execute when the rollback operation completes. The logic of FIG. 3 is invoked from Block 200 to determine whether there are any such GUI scripts to roll back.

Figure 3:
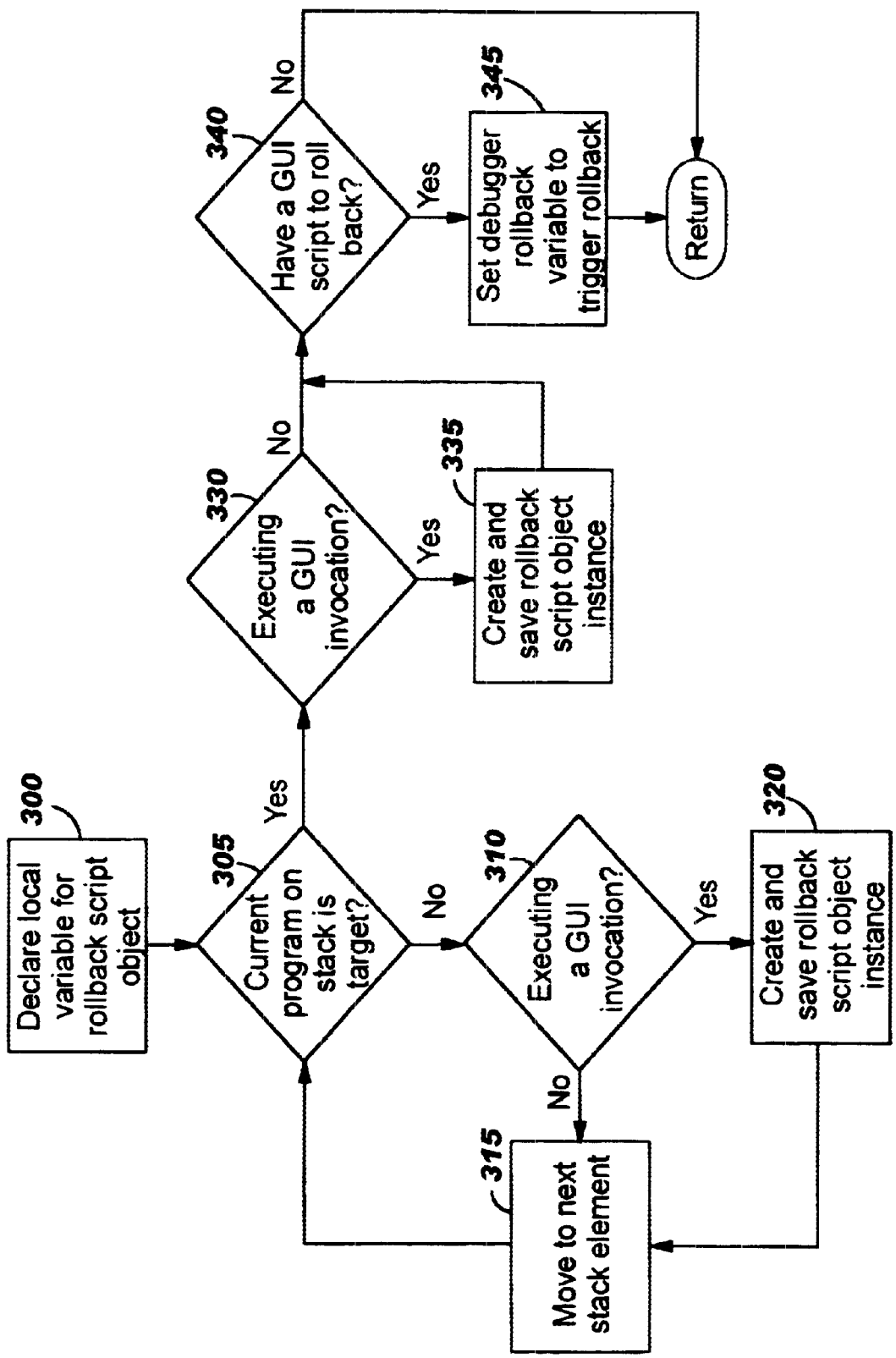

The test in Block 205 checks to see if there is a GUI script to be rolled back, based on the value of a debugger rollback instance variable that may have been set during operation of FIG. 3 (in Block 345). If this test has a negative result, then the rollback operation occurs solely within the procedural code debugger and uses techniques which are known in the art, as indicated in Block 210. Following operation of those prior art techniques, the procedural debugger is ready to execute the appropriate next statement (Block 215), and thus control returns (Block 235) from the processing of FIG. 2 to the invoking logic.

When the test in Block 205 has a positive result, then there is at least one GUI script that must be rolled back, using the techniques of the present invention. One or more process frames must be popped off a UI process stack (as will be described below with reference to FIG. 4), effectively backing up in the OO execution path such that the UI process is properly synchronized with the next statement to be executed in the procedural code.

Figure 5A:
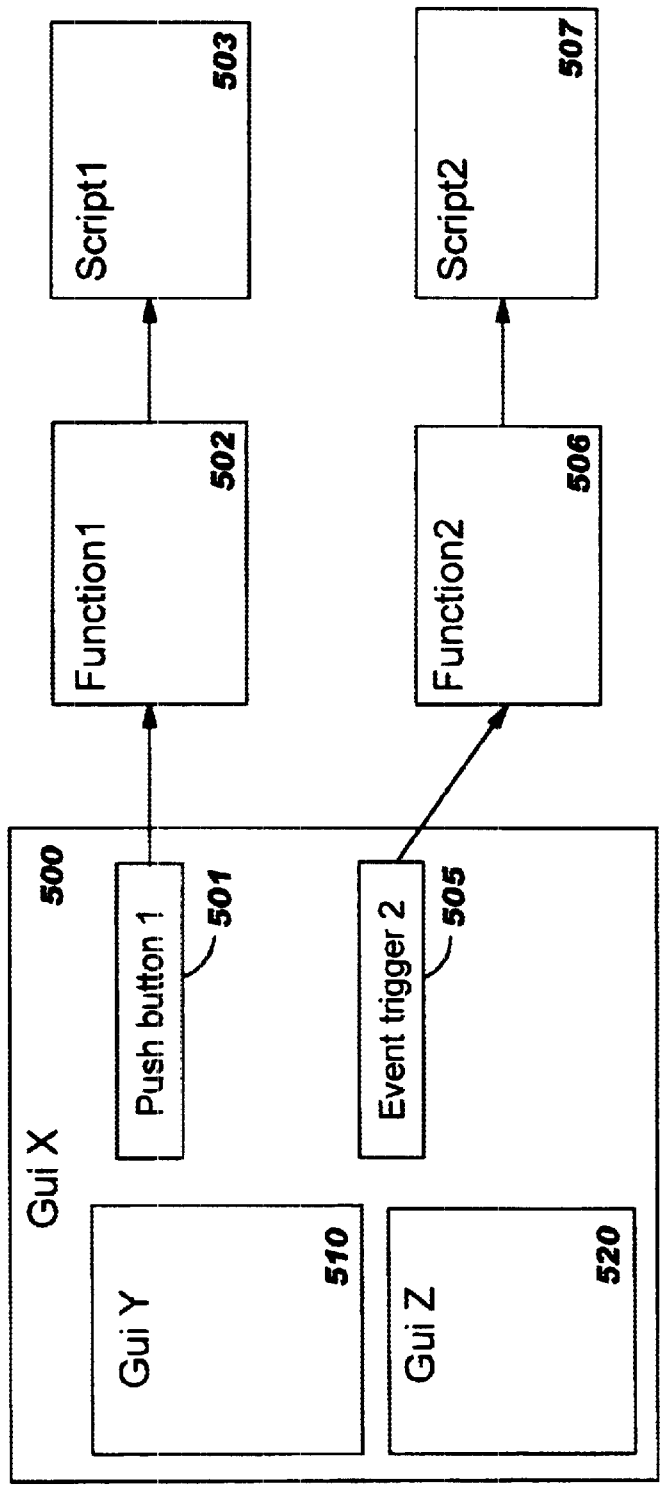
FIG. 5 illustrates an example GUI that contains other embedded GUIs, showing the relationship between the GUIs and their invocation of OO scripts (and is used as the basis for FIG. 6)
Figure 5:
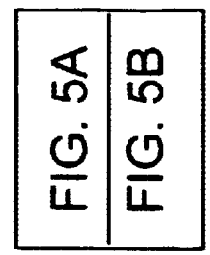
Figure 6:
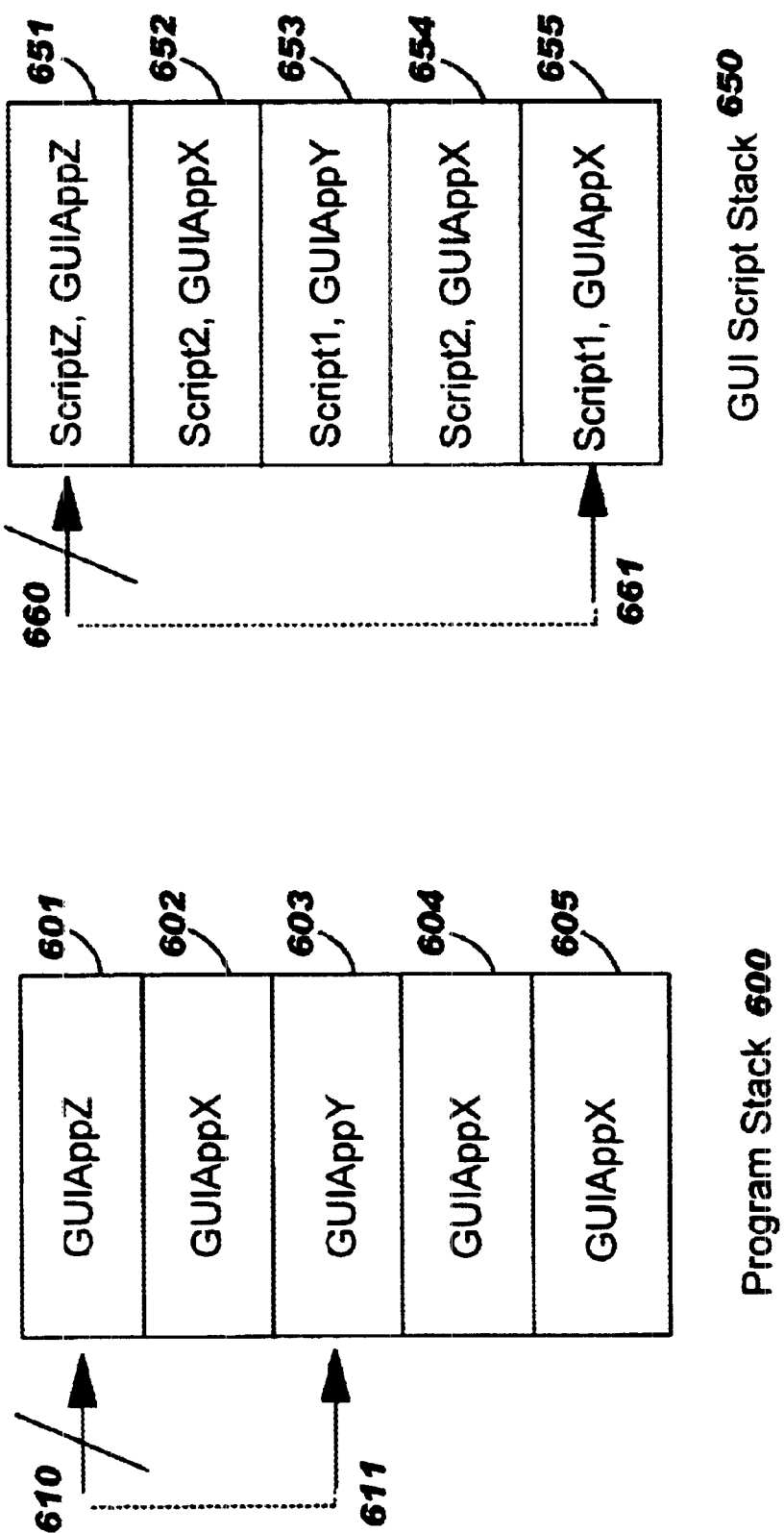
FIG. 6 illustrates a simple example of program stacks, illustrating how the repositioning operation of the present invention must synchronize the stacks in both the OO world of the GUI and in the procedural language world of the procedural code debugger.

Referring now to FIGS. 5 and 6, an example is provided to illustrate inter-relationships between information about what is happening in the non-OO process and in the UI process. FIG. 5A shows a GUI named "X" 500, which includes 2 event triggers (denoted as "Push button 1", element 501, and "Event trigger 2", element 505). GUI X also includes 2 embedded GUI's, named "Y" 510 and "Z" 520. Upon pressing push button 1 of this example, a procedural code component named "Function1" 502 is invoked. As it executes, Function1 invokes a GUI script named "Script1" 503. According to the second related invention, when a procedural code component encounters (and executes) a GUI script, an element is placed on a GUI script stack. FIG. 6 illustrates this, wherein program stack 600 keeps track of the currently-executing procedural code component, and GUI script stack 650 contains a stack element for each procedural code component that is currently executing a GUI script. To enable adapting GUI events to an existing non-OO debugging environment, GUIs are "wrapped" (using existing techniques) by a class that will be referred to herein as "GUIApplication". As a GUI event that executes a procedural code component is fired, the GUI application that fired the event is wrapped with a unique instance of GUIApplication. Thus, in the example scenario of FIG. 5A, when the developer presses push button 1 501 on GUI X 500 (and causes execution of Function1), an instance is created which, for this example, is referred to as "GUIAppX". This instance is pushed onto program stack 600 as element 605. When Function1 502 encounters and invokes an EZESCRPT statement, an element is pushed onto GUI script stack 650. In this example, the invocation of Script1 503 therefore causes element 655 to be pushed onto GUI script stack 650.

Now suppose that the event corresponding to Event trigger 2 505 is triggered (e.g. due to text changes in a field, enabling or disabling a field, executing a VG function directly from script code, etc.) before Function1 502, and Script1 503, completes. Function2 506 is invoked when this event fires, and another instance of "GUIAppX" is therefore created (reflecting by this name that Event trigger 2 505 resides within GUI X 500). Corresponding element 604 is also pushed onto program stack 600. Upon executing Script2 507 from Function2 506, an element 654 is pushed onto GUI script stack 650. (If the non-OO component does not encounter an EZESCRPT statement, then no corresponding element will be pushed onto the GUI script stack 650.)

Figure 5B:
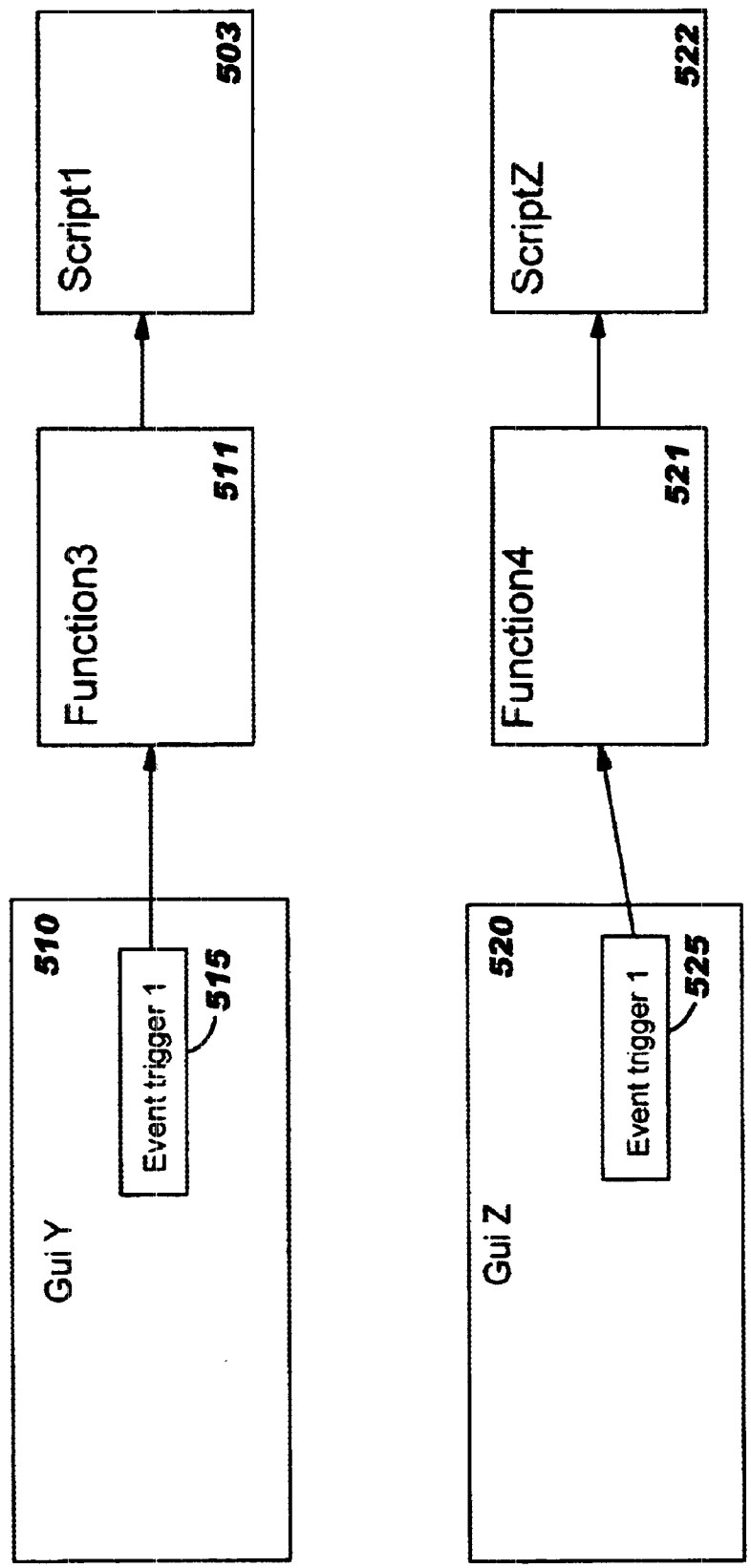

Further suppose that the event corresponding to Event trigger 1 515 of embedded GUI Y 510 is then triggered, before either Function1 502 or Function2 506 has completed, causing invocation of Function3 511, as shown in FIG. 5B A GUIApplication which is denoted as "GUIAppY" in FIG. 6 is therefore created, and element 603 is pushed onto program stack 600. When Function3 511 executes Script1 503 (the same script that Function1 502 is currently executing), element 653 is pushed onto GU[ script stack 650. Next, suppose that the event corresponding to Event trigger 2 505 of GUI X 500 is triggered again (before any currently-executing procedural code components or scripts complete), and Function2 506 and Script2 507 execute from this new event. Stack elements 602 and 652 correspond to these invocations. Finally, in this example, Event trigger 1 525 on GUI Z 520 is triggered, and Function4 521 and ScriptZ 522 execute from this event. Stack elements 601 and 651 represent these invocations.

At this point, the stacks contain elements representing multiple event firings from one GUI (i.e. the 3 triggered events from GUI X, each of which has a unique stack element) and multiple invocations of particular scripts (i.e. 2 invocations of Script1, each from an event on a different GUI, and 2 invocations of Script2, both from an event on the same GUT). (In addition, recursive invocations may occur, although these have not been illustrated in the example.) The stack pointers 610 and 660 point to the element currently being executed in the non-OO and in the UI process, respectively. As a procedural code component completes, its corresponding stack element is popped from program stack 600 and the corresponding GUI script stack 650 element (if any) is also popped. For example, when ScriptZ 522 finishes, and Function4 521 then finishes, both elements 601 and 651 are popped from their stacks.

Each element placed on GUI script stack 650 contains an object which records the name of the GUI script, the name of the GUI application from which it was invoked, and a unique identification of the GUI application instance. For ease of illustration, the GUI application instance has not been shown in FIG. 6. (The unique GUI application instance enables differentiating between elements having the same script name and GUI application name, such as elements 652 and 654, in order to associate the GUI script invocations with the proper component execution. However, use of the application instance may be omitted in an alternative embodiment of the present invention, if desired, such that only the GUI script name and GUI application name are used. The manner in which the flowcharts are to be altered for this alternative will be obvious to one of ordinary skill in the art.)

In order to determine how far back in the UI process to go during the rollback operation, an object is built that will be compared (as will be described in more detail below) to the stacked objects on the GUI script stack. This object contains the name of the script to be rolled back to, as well as the identification of the GUI application instance in which the script is executing. The object is built in FIG. 3 and checked in Block 205 of FIG. 2.

Returning now to FIG. 2, the procedural code is then rolled back (Block 220) using existing techniques. Block 225 performs a rollback of the OO code, as depicted in more detail with reference to FIG. 4. In this logic, the UI process will be positioned to a method that is invoked according to the related inventions to run a GUI script, and which (in a Smalltalk implementation) may be named "runGuiScript:". A rollback flag (which is preferably stored within each object placed on GUI script stack 650) is also set to either TRUE or FALSE during the processing of FIG. 4. Block 230 checks the value of this rollback flag (which may have been set by Block 405 of FIG. 4) to see if the GUI script whose name is passed to the runGuiScript: method is being rolled back. If the flag is set to TRUE, then the statements in the associated script are not to be executed, so control returns to the interactive test facility (as shown at Block 235) to enable the developer to control what happens next. Otherwise, when the flag is not set to TRUE, the script is executed (Block 240) using techniques such as those described in the second related invention.

FIG. 3 depicts the logic used by the preferred embodiment to determine whether there is a GUI script to be rolled back. This processing corresponds to Block 200 of FIG. 2, and evaluates the elements on a program stack for the non-OO code debugger to determine whether there is an OO script (1) that is currently being executed and (2) which needs to be cleaned up. With reference to the example program stack 600 in FIG. 6, suppose the currently-executing application is "GUIAppZ" 601. Stack pointer 610 points to the stacked element for this code component, which is located at the top of program stack 600. Further suppose that the developer has requested to roll back processing to code component "GUIAppY" 603 (i.e. to execution of Function3 511, depicted in FIG. 5B), as indicated by the moved stack pointer 611. The logic of FIG. 3 will pop elements 601 and 602 off the stack 600, leaving element 603 at the top of the stack as the code component to be executed next.

The processing of FIG. 3 begins by declaring a local "rollback script object" instance (Block 300). (A local variable is used within the processing of FIG. 3 for performance reasons.) This local variable is then used at Blocks 340 and 345 to set a debugger rollback instance variable which is tested in Block 205, as described above, after the processing of FIG. 3 completes. The object instance is designed to hold a rollback script object, and is initially nil. Block 305 checks the next element on the non-OO stack to see if it contains the target component or application program that is to be rolled back to. On the first iteration through this logic, the next element is the original element at the top of the non-OO stack. On subsequent iterations (i.e. until reaching the target component), the next-lower element on the non-OO stack is checked. With reference to the non-OO stack 600 in FIG. 6, the processing of Block 305 comprises determining whether the stack pointer 610 points to an element for the target component GUIAppY. When the test in Block 305 has a negative result (as it does on the first and second iterations through this logic for the example stack 600 of FIG. 6), then execution is being rolled back to a previous non-OO code component, and processing continues at Block 310. Otherwise, processing continues at Block 330. (In the example of FIG. 6, processing transfers to Block 330 on the third iteration through this logic, when stack pointer 610 has moved to position 611.)

The test in Block 310 asks whether the current non-OO code statement being executed within the code component represented by the top element on the non-OO stack is an EZESCRPT statement or analogous GUI invocation. If not, control transfers to Block 315, which pops the top element off the non-OO stack and moves the stack pointer to point to this new top element, after which control returns to Block 305. Otherwise, when the test in Block 310 has a positive response, Block 320 creates a rollback script object in which the script name and GUI application instance are set to the name and identifier obtained from the current program stack element. The rollback script object is then saved as the value of the local variable declared in Block 300, and processing returns to Block 315 to move the stack pointer. (Note that the value in the local rollback script object may be overridden subsequently during the processing of FIG. 3 if a next-lower program stack element is found which is also executing a GUI invocation.)

Control reaches Block 330 when the top element on the non-OO stack is the element for the target code component. With reference to the example previously discussed, the stack pointer will be at position 611, pointing to code component GUIAppY. Block 330 performs the same test as Block 310, to determine whether the target code component was executing a GUI script invocation. If so, then Block 335 creates and saves a rollback script object in the local variable declared at Block 300, in the same manner previously described with reference to Block 320. (This rollback script object overrides any previously-stored object that may have been created at Block 320 during this iteration through the processing of FIG. 3.)

Block 340 is reached when the code component at the top of the non-OO stack is not currently executing a GUI script, and also following the processing of Block 335. The test in Block 340 therefore checks to see if the local variable used to store the rollback script object has been changed from its initial nil value. If it has not, then there is no GUI script to manipulate (and neither Block 320 nor Block 335 was executed), so control simply returns to the invoking logic of FIG. 2. Otherwise, when the variable has a non-nil value, the test in Block 340 has a positive result and Block 345 therefore sets a debugger rollback instance variable. Control then returns to the invoking logic in FIG. 2, where this instance variable is checked at Block 205.

Figure 4A:
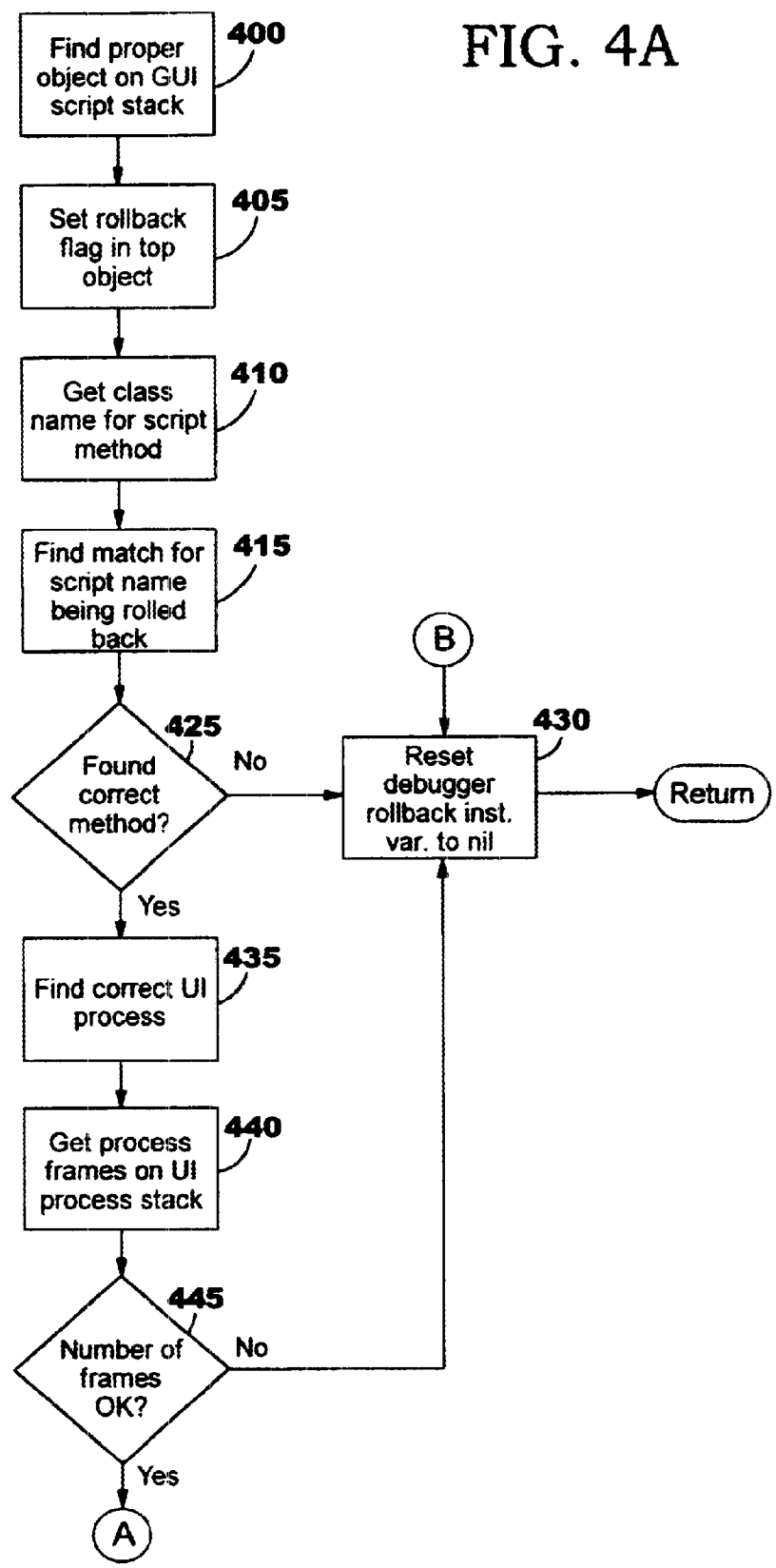
Figure 4B:
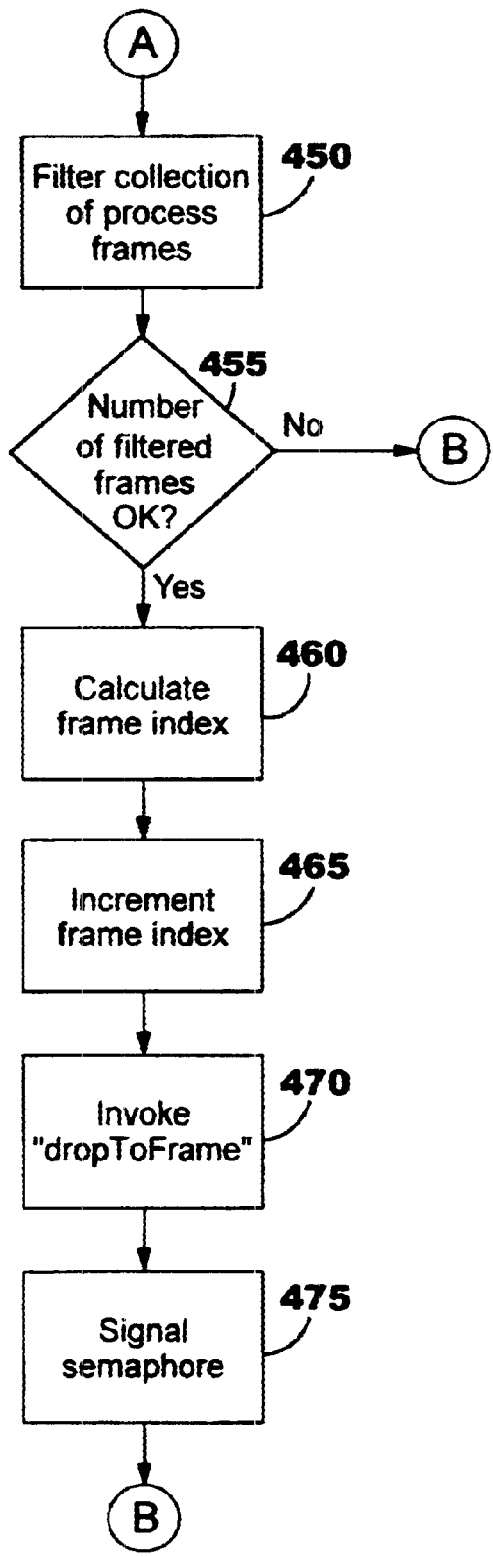

The logic depicted in FIG. 4 performs the actual rolling back of the GUI script such that the UI process is properly synchronized with the non-OO process when the developer regains control of the debugging operation. This logic is invoked from Block 225 of FIG. 2.

The GUI rollback process begins at Block 400, where the proper object on a GUI script stack (illustrated by stack 650 in FIG. 6) is located. This comprises searching through the stacked elements, beginning at the top, until finding a stacked object which has the same script name and the same GUI application instance as that which was stored in the rollback script object created during the processing of FIG. 3. (See the description of Blocks 320 and 335.) Any stacked elements that are evaluated during this process, and which do not match both the script name and GUI application instance, are popped off the GUI script stack. In addition, according to the preferred embodiment, any objects on the GUI script stack having a matching script name and GUI application name but a different GUI application instance are counted using a counter that will be referred to hereinafter as "ObjectCount". Checking for a matching GUI application instance, rather than simply a matching GUI application name, enables properly handling cases where a particular script is invoked (and therefore has objects on the GUI script stack) multiple times from the same GUI: the proper one of these stacked invocations is obtained at Block 400.

Once the proper stacked object is located (and is now at the top of GUI script stack 650), Block 405 sets a rollback flag in this stacked object to indicate that this GUI script is being rolled back. (This flag is subsequently checked at Block 230 of FIG. 2.) Block 410 obtains the class name of the GUI application that this script method belongs to. This comprises sending a message to the GUI application, using prior art techniques. The compiled methods for this class are then searched (Block 415) to find the method matching the name of the script being rolled back. If necessary, the class hierarchy chain is traversed, in case the method is inherited from a superclass. Block 425 asks whether the correct compiled method was located. If not, this is an error condition, and control transfers to Block 430 where the debugger rollback instance variable is preferably set to nil. (Alternative processing may be provided for error conditions and an error message may also be displayed, if desired.)

Block 435 is reached when the correct compiled method was located. The correct Smalltalk UI process for the active non-OO process is located next, using techniques which are known in the art. (In the preferred Smalltalk embodiment, this comprises using a class variable which maps the UI process to the correct debugger instance. In a Java implementation, this comprises passing GUT script information to the Java image. Java code then determines the correct UI process.) Block 440 obtains all the process frames currently on this UI process stack, and creates a collection therefrom which has only the frames with matching method (i.e. script) names. Block 445 checks whether the number of entries in this collection is at least as many as the value of the ObjectCount variable set in Block 400. If not, this is an error condition and control transfers to Block 430. Otherwise, processing continues at Block 450 (see FIG. 4B) where the collection is filtered. This filtering process comprises evaluating each process frame in the collection, and keeping only those where the method prior to the script invocation is a method of the interactive test facility. (This handles the case where the method was invoked in ways other than by an OO script invocation, such as a user invocation or recursive script invocations from within the script itself, as these other invocations are not subject to the manipulation technique of the present invention.)

Block 455 checks to see if the number of frames in the resulting filtered collection is sufficient, that is, if the size of the filtered collection is greater than or equal to the Object-Count value. If not, this is an error and control transfers to Block 430. Otherwise, processing continues at Block 460.

Block 460 calculates the frame index of the correct script invocation. For example, if the filtered collection has 3 members and the ObjectCount value is 2, then the frame index points to the second of the 3 members in the collection. Block 465 adds 1 to this calculated frame index value, to enable moving below the script invocation to the "runGuiScript:" method which preceded it. Block 470 then invokes the Smalltalk method "dropToFrame:" to position execution at this runGuiScript: method. Block 475 signals a semaphore of the test facility (which is used as described in the second related invention), after which control returns to Block 430 to reset the debugger rollback instance variable to nil in order to prevent re-executing the rollback process. Upon returning control to the Smalltalk engine (i.e., after returning to Block 230 of FIG. 2), execution of the GUI script will be skipped based upon this flag setting, and control will then return back to the ITF to enable the developer to continue the debugging process.

While the preferred embodiment has been described in terms of a Smalltalk implementation, a Java implementation is similar. In a Java implementation, the processing of Block 405 comprises sending a message to the Java UI requesting it to manipulate the top stacked element. The processing of Blocks 410 through 470 in a Java implementation is then performed, in a manner analogous to that described with reference to the Smalltalk preferred embodiment.)

Figure 7:
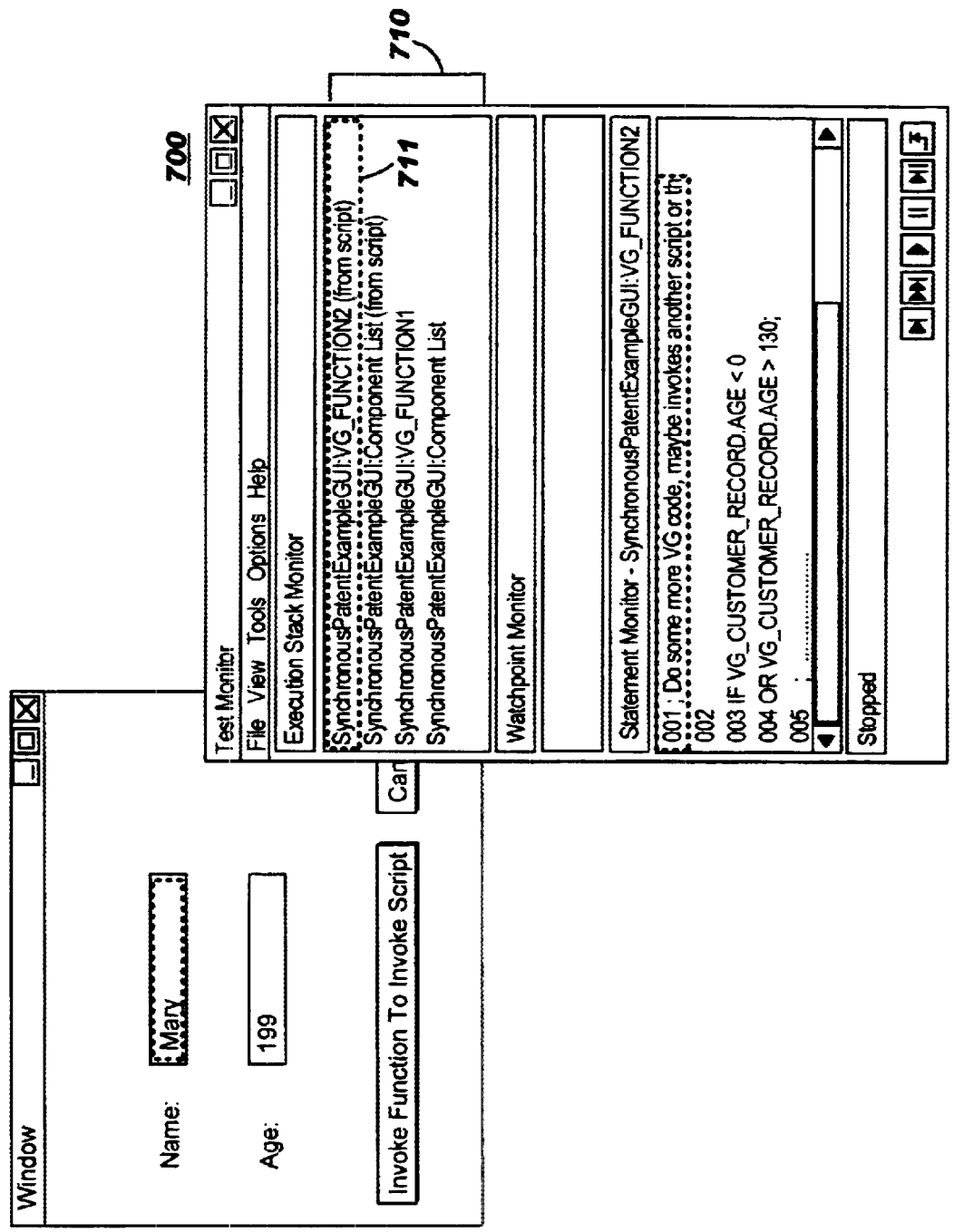
Figure 8:
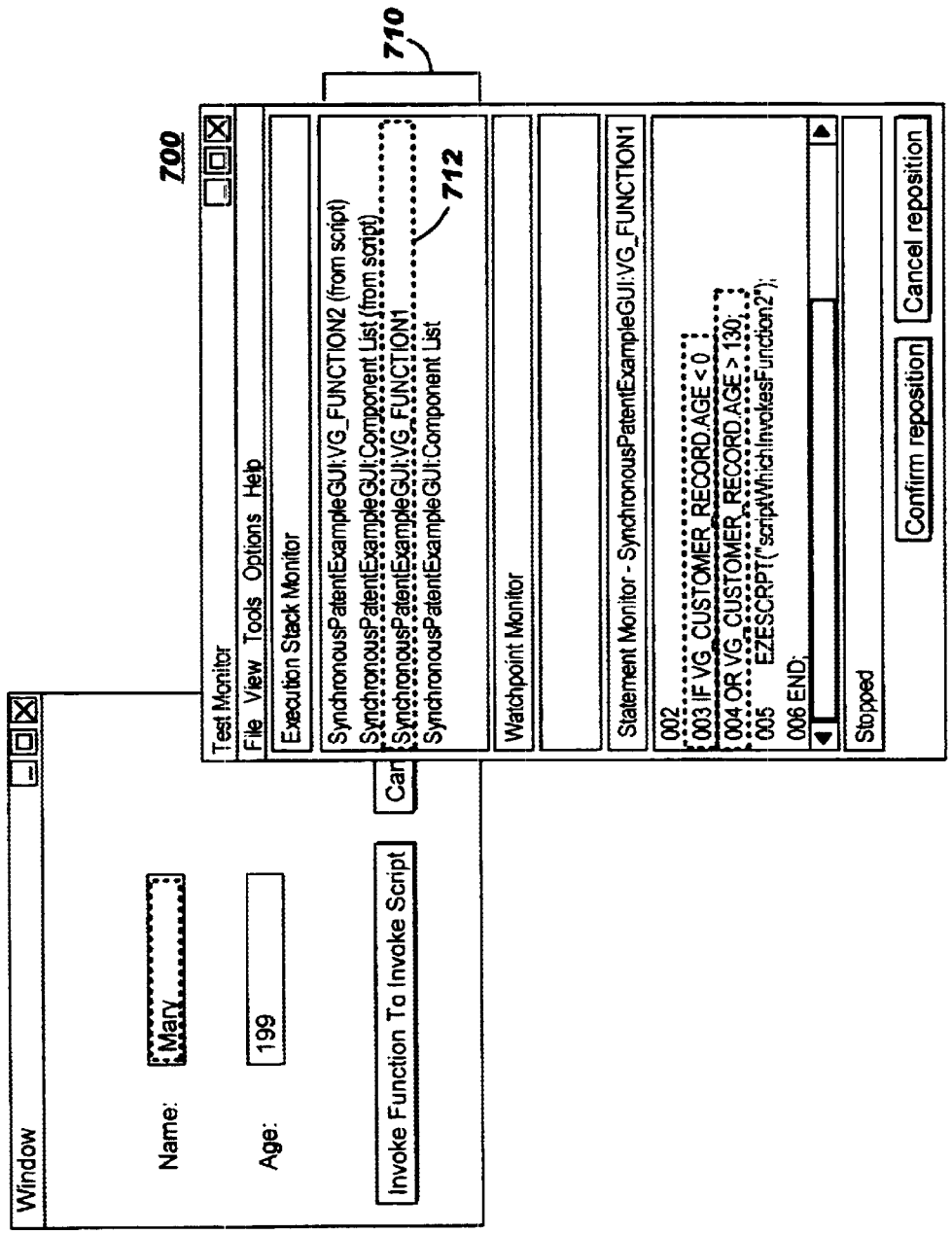
Figure 9:
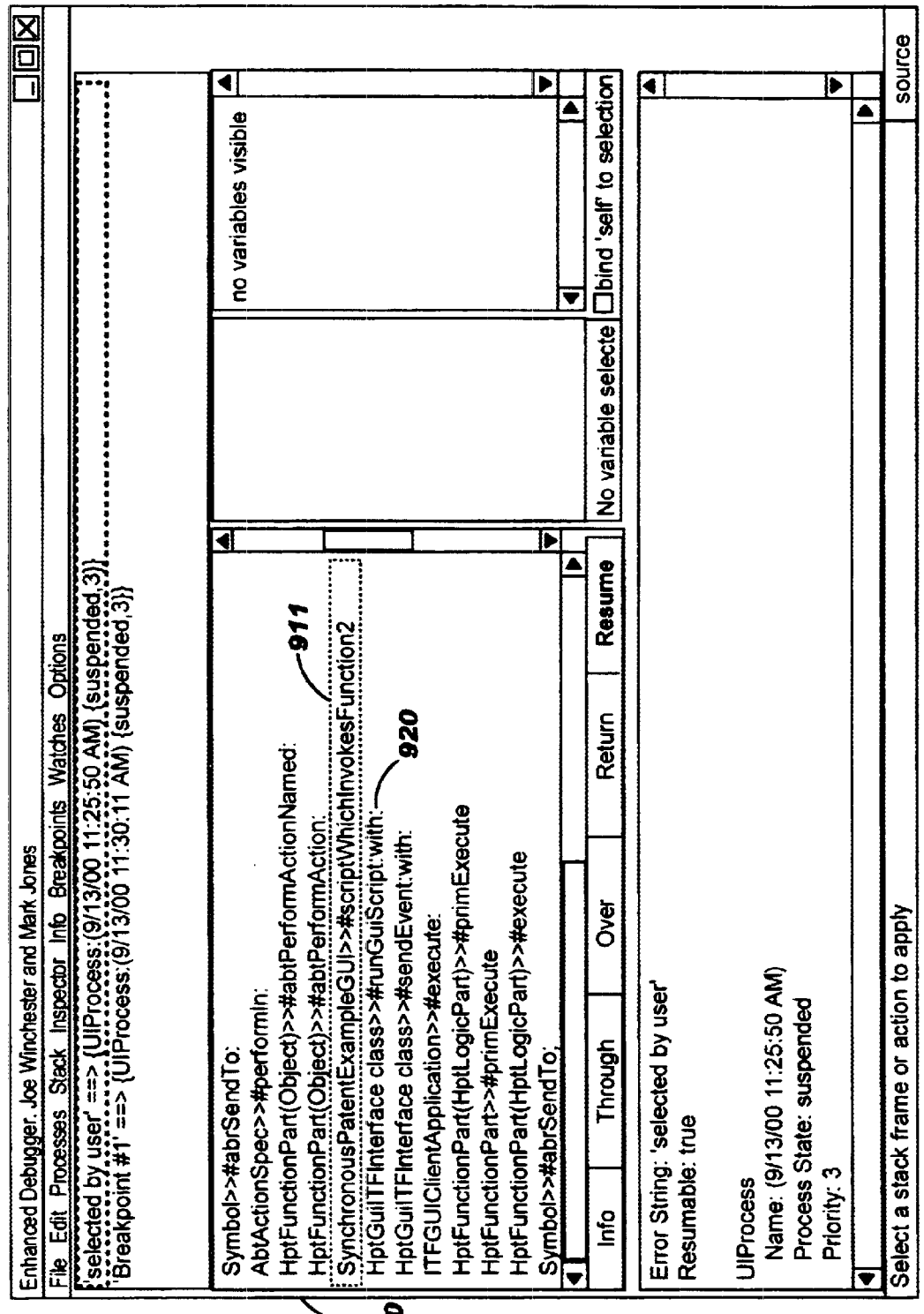

FIG. 7 illustrates a sample test monitor window 700 that may occur when using a procedural code debugger. The execution stack monitor area 710 shows several stacked components that are in the process of executing, where highlighting shows that the topmost entry 711 is currently executing. FIG. 8 shows the highlighting having moved to the third entry 712 of this list, which in this example reflects the developer's choice to back up to this point in the execution path. FIG. 9 illustrates the UI process stack that is being manipulated according to the logic of FIG. 4. In this example 900, the GUI application name of interest, "SynchronousPatentExampleGUI" (which matches the component name selected at 712 of FIG. 8), is located in a process frame shown at 910. The invoked GUI script name, "scriptWhichnvokesFunction2", is shown at 911 in this process frame. This GUI script name 911 corresponds to the GUI script invocation 1010 that is shown in the procedural component named "VG_FUNCTION1" 1000 of FIG. 10. (Note that VG_FUNCTION1 is also the name shown in selected entry 712 of FIG. 8. The previously-executing component, named VG_FUNCTION2, is shown in highlighted entry 711 of FIG. 7.) The next-previous method invocation, shown at 920, is the runGuiScript:with: method previously discussed (wherein it was referred to as "runGuiScript:", although in this figure it is shown as taking an additional parameter).

Thus, it can be seen from the descriptions above that the present invention enables OO code to be properly synchronized during rollback operations that are initiated within a procedural code debugger.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A computer program product for programmatically maintaining synchronization of object-oriented code during a repositioning operation occurring in a procedural language code debugger that supports integrated execution of procedural language code components and object-oriented methods, the computer program product embodied on one or more computer-readable media and comprising:

computer-readable program code means for executing one or more object-oriented methods written in an object-oriented programming language;

computer-readable program code means for executing, under control of the procedural language code debugger, one or more procedural language code components written in a procedural programming language, wherein at least one of the procedural language code components contains one or more references to selected ones of the object-oriented methods;

computer-readable program code means for detecting a repositioning of execution, in the procedural language code debugger, to a particular procedural language code component;

computer-readable program code means for determining whether any currently executing ones of the object-oriented methods should be rolled back, based upon the repositioning to the particular procedural language code component, in order to maintain synchronization of the object-oriented methods with the procedural language code components; and computer-readable program code means for rolling back one or more of the currently executing object-oriented methods, as determined by the computer-readable program code means for determining, thereby maintaining the synchronization.

2. The computer program product according to claim 1, wherein the computer-readable program code means for determining further comprises:

computer-readable program code means for interrogating a stack which comprises an element for each currently executing object-oriented method invoked by one or more currently executing procedural language code components; and computer-readable program code means for determining, during operation of the computer-readable program code means for interrogating, whether an element corresponding to the particular procedural language code component is present on the stack.

3. The computer program product according to claim 2, wherein the computer-readable program code means for rolling back further comprises:

computer-readable program code means for popping all stack elements up to the corresponding element, if the corresponding element is present, or up through an element next preceding where the corresponding element would have been on the stack, otherwise;

computer-readable program code means for finding a set of frames on a user interface process stack where the set comprises those referencing a name of an object-oriented method that was invoked by the particular procedural language code component;

computer-readable program code means for positioning to a selected one of the set of frames, wherein the selected one is that which precedes an invocation of the object-oriented method having the name; and computer-readable program code means for removing all frames from the user interface process stack up to the selected one.

4. The computer program product according to claim 1, wherein the procedural language code debugger and the object-oriented method operate in different processes.

5. The computer program product according to claim 1, wherein the procedural language code debugger and the object-oriented method operate in different software products.

6. The computer program product according to claim 1, wherein the procedural language code debugger and the object-oriented method operate in different namespaces.

7. The computer program product according to claim 1, wherein the computer-readable program code means for detecting the repositioning further comprises computer-readable program code means for detecting a user-initiated rollback.

8. The computer program product according to claim 1, wherein the computer-readable program code means for detecting the repositioning further comprises computer-readable program code means for detecting a rollback initiated by the procedural language code debugger.

9. A system for programmatically maintaining synchronization of object-oriented code during a repositioning operation occurring in a procedural language code debugger that supports integrated execution of procedural language code components and object-oriented methods, comprising:

means for executing one or more object-oriented methods written in an object-oriented programming language;

means for executing, under control of the procedural language code debugger, one or more procedural language code components written in a procedural programming language, wherein at least one of the procedural language code components contains one or more references to selected ones of the object-oriented methods;

means for detecting a repositioning of execution, in the procedural language code debugger, to a particular procedural language code component;

means for determining whether any currently executing ones of the object-oriented methods should be rolled back, based upon the repositioning to the particular procedural language code component, in order to maintain synchronization of the object-oriented methods with the procedural language code components; and means for rolling back one or more of the currently executing object-oriented methods, as determined by the means for determining, thereby maintaining the synchronization.

10. The system according to claim 9, wherein the means for determining further comprises:

means for interrogating a stack which comprises an element for each currently executing object-oriented method invoked by one or more currently executing procedural language code components; and means for determining, during operation of the means for interrogating, whether an element corresponding to the particular procedural language code component is present on the stack.

11. The system according to claim 10, wherein the means for rolling back further comprises:

means for popping all stack elements up to the corresponding element, if the corresponding element is present, or up through an element next preceding where the corresponding element would have been on the stack, otherwise;

means for finding a set of frames on a user interface process stack where the set comprises those referencing a name of an object-oriented method that was invoked by the particular procedural language code component;

means for positioning to a selected one of the set of frames, wherein the selected one is that which precedes an invocation of the object-oriented method having the name; and means for removing all frames from the user interface process stack up to the selected one.

12. The system according to claim 9, wherein the procedural language code debugger and the object-oriented method operate in different processes.

13. The system according to claim 9, wherein the procedural language code debugger and the object-oriented method operate in different software products.

14. The system according to claim 9, wherein the procedural language code debugger and the object-oriented method operate in different namespaces.

15. The system according to claim 9, wherein the means for detecting the repositioning further comprises means for detecting a user-initiated rollback.

16. The system according to claim 9, wherein the means for detecting the repositioning further comprises means for detecting a rollback initiated by the procedural language code debugger.

17. A method for programmatically maintaining synchronization of object-oriented code during a repositioning operation occurring in a procedural language code debugger that supports integrated execution of procedural language code components and object-oriented methods, comprising the steps of:

executing one or more object-oriented methods written in an object-oriented programming language;

executing, under control of the procedural language code debugger, one or more procedural language code components written in a procedural programming language, wherein at least one of the procedural language code components contains one or more references to selected ones of the object-oriented methods;

detecting a repositioning of execution, in the procedural language code debugger, to a particular procedural language code component;

determining whether any currently executing ones of the object-oriented methods should be rolled back, based upon the repositioning to the particular procedural language code component in order to maintain synchronization of the object-oriented methods with the procedural language code components; and rolling back one or more of the currently executing object-oriented methods, as is determined by the determining step, thereby maintaining the synchronization.

18. The method according to claim 17, wherein the determining step further comprises the steps of:

interrogating a stack which comprises an element for each currently executing object-oriented method invoked by one or more currently executing procedural language code components; and determining, during operation of the interrogating step, whether an element corresponding to the particular procedural language code component is present on the stack.

19. The method according to claim 18, wherein the rolling back step further comprises the steps of;

popping all stack elements up to the corresponding element, if the corresponding element is present, or up through an element next preceding where the corresponding element would have been on the stack, otherwise;

finding a set of frames on a user interface process stack where the set comprises those referencing a name of an object-oriented method that was invoked by the particular procedural language code component;

positioning to a selected one of the set of frames, wherein the selected one is that which precedes an invocation of the object-oriented method having the name; and removing all frames from the user interface process stack up to the selected one.

20. The method according to claim 17, wherein the procedural language code debugger and the object-oriented method operate in different processes.

21. The method according to claim 17, wherein the procedural language code debugger and the object-oriented method operate in different software products.

22. The method according to claim 17, wherein the procedural language code debugger and the object-oriented method operate in different namespaces.

23. The method according to claim 17, wherein the detecting step further comprises the step of detecting a user-initiated repositioning.

24. The method according to claim 17, wherein the detecting step further comprises the step of detecting a repositioning initiated by the procedural language code debugger.

* * * * *